US005450058A

United States Patent [19]

Collier

[11] Patent Number: 5,450,058
[45] Date of Patent: Sep. 12, 1995

[54] SYSTEM AND METHOD OF DEPLOYING A HAZARD SIGN FROM A MOVING VEHICLE

[76] Inventor: Stanton E. Collier, 108 Greenpoint Cir., Chicopee, Mass. 01020

[21] Appl. No.: 192,016

[22] Filed: Feb. 4, 1994

[51] Int. Cl.⁶ .............................................. B60Q 7/00
[52] U.S. Cl. ................................. 340/473; 340/908; 40/643; 40/574; 40/528; 40/590; 40/591; 40/594; 40/611
[58] Field of Search ............... 360/473, 471, 321, 908, 360/908.1, 484, 485; 40/643, 532, 488, 490, 491, 560, 574, 575, 588, 589, 590, 591, 594, 603, 611, 618

[56] References Cited

U.S. PATENT DOCUMENTS

| 2,194,818 | 3/1940 | Book | 340/321 |
| 2,669,705 | 2/1954 | Collins | 304/908 |
| 2,894,257 | 7/1959 | Crooks | 340/473 |
| 2,997,573 | 8/1961 | Nyborg | 340/473 |
| 3,729,706 | 4/1973 | Hein | 340/908 |
| 4,357,768 | 11/1982 | De Dube | 40/17 |
| 4,580,361 | 4/1986 | Hallstrom et al. | 40/603 |
| 4,613,847 | 9/1986 | Scolari et al. | 340/473 |
| 4,952,910 | 8/1990 | Straten et al. | 340/908 |
| 5,053,746 | 10/1991 | Taneo | 340/473 |
| 5,103,205 | 4/1992 | Halligan | 340/423 |

Primary Examiner—Brent Swarthout
Assistant Examiner—Nina Tong
Attorney, Agent, or Firm—Stanton E. Collier

[57] ABSTRACT

The deployable hazard sign from a moving vehicle comprises a means for attaching the hazard sign to the rear area of a police vehicle, for example; a means of releasing the hazard sign which also allows easy recovery; a means for powering the hazard sign once released; a means for communicating to the hazard sign the proper warning information before the release thereof; a means attached to the hazard sign to indicate that an approaching vehicle has impacted the hazard sign, and further means of allowing the elevating of the warning lights before or after release. As the police vehicle approaches the breakdown or accident, the deployable hazard sign would be released from the police vehicle, appproximately 200 to 500 feet, behind the breakdown or accident. The policeman inside would determine the proper sign mode before release. The police vehicle would not have to stop to release the sign. After the situation has cleared, the police vehicle could backup to the sign to retrieve it.

19 Claims, 7 Drawing Sheets

SYSTEM AND METHOD OF DEPLOYING A HAZARD SIGN FROM A MOVING VEHICLE

BACKGROUND OF THE INVENTION

The present invention relates to hazard signs for roads, highways, turnpikes, etc., and, in particular, hazard signs used by, for example, police vehicles.

If a vehicle breaks down on the road, a police vehicle would stop to provide assistance by pulling in either in front of or behind the disabled vehicle, preferrably, and turn on its warning lights such as a light bar attached on top of the police vehicle or inside the police vehicle. This light bar would totally flash or, if available, would flash in a directional manner to warn approaching vehicles of the breakdown. If this breakdown occurred during rush hour on a major highway, the hazard to either vehicle and occupants is greatly increased. This is more so if the breakdown occurs during bad weather. Unfortunately, many vehicles travel in the breakdown lane for whatever reasons, if there is one available, and if there is not sufficient warning, an accident could easily occur in which people are killed. The likelyhood of such an accident increases greatly if the disabled vehicle is in a lane of travel. Not only must the police vehicle stop traffic but the traffic must be diverted around the disabled vehicle in an orderly manner. The danger to the policeman in the above situations or similar ones is clear and present and many have been killed providing assistance. The goal is to warn the approaching traffic of the accident and also have that traffic stop if necessary or avoid the disabled vehicle. Another danger is the drunken driver who is not able to react to the above warnings and plows into the stopped vehicles causing great damage and injury irrespective of any warning.

Thus, there is a need for a means of warning the approaching traffic of the accident or breakdown, conveying proper instructions, and protecting the police or emergency personnel on the scene.

SUMMARY OF THE INVENTION

The present invention is a deployable hazard sign which can be dropped on the ground or pavement from a moving vehicle.

The present invention comprises a means for attaching the hazard sign to the rear area of a police vehicle, for example; a means of releasing the hazard sign which also allows easy recovery; a means for powering the hazard sign once released; a means for communicating to the hazard sign the proper warning information before the release thereof; a means attached to the hazard sign to indicate that an approaching vehicle has impacted the hazard sign, and, further, means of allowing the elevating of the warning lights before or after release.

As the police vehicle approaches the breakdown or accident, the deployable hazard sign would be released from the police vehicle, approximately 200 to 500 feet, behind the breakdown or accident. The policeman inside would determine the proper sign mode before release. The police vehicle would not have to stop to release the sign. After the situation has cleared, the police vehicle could back up to the sign to retrieve it. The sign is also able to be operated while attached to the police vehicle, if desired.

Therefore, one object of the present invention is to provide a deployable hazard sign that can be dropped on the highway from a moving vehicle;

Another object of the present invention is to provide a deployable hazard sign that is retrievable, easily moved, easily manufactured and can be attached to a vehicle with a minimum of modifications, etc;

Another object of the present invention is to provide a deployable hazard sign that warns of an impact thereon;

Another object of the present invention is to provide a hazard sign that can be operated while attached to the police vehicle, for example, to act as a supplemental warning means;

Another object of the present invention is to provide a deployable hazard sign that may be elevated to provide a warning to vehicles at a greater distance.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
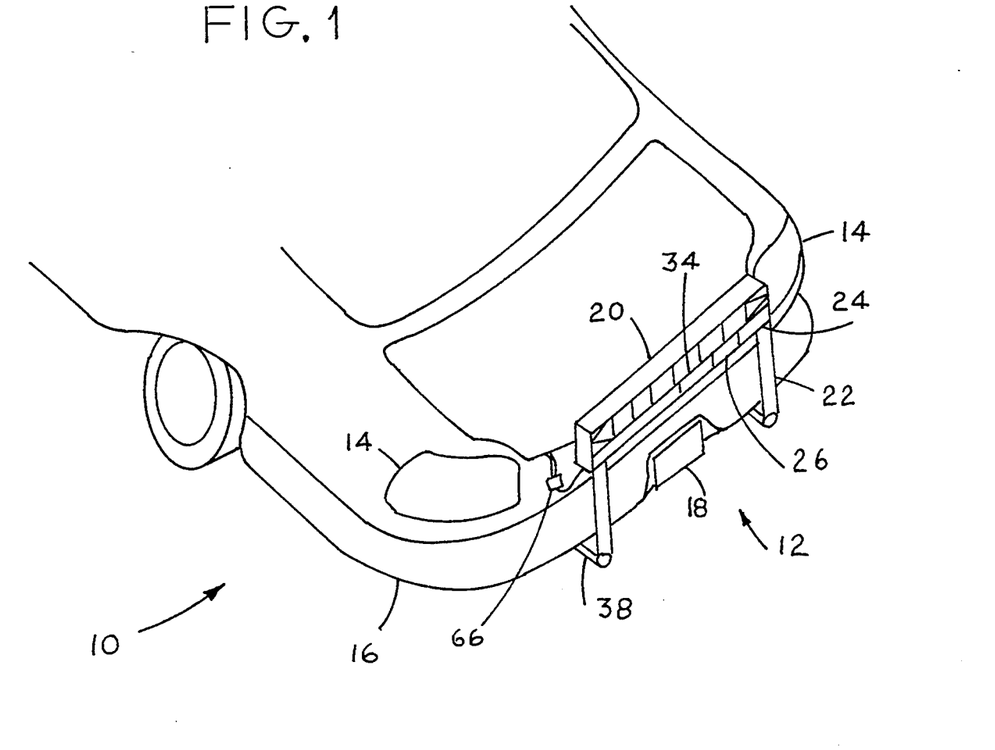
FIG. 1 illustrates by perspective view a rear of a vehicle on which the present invention is mounted.

Referring to FIG. 1, an emergency vehicle 10, like a police vehicle, road assistance vehicle, has a deployable hazard sign 12 removably attached to the rear of the vehicle 10 in between the tail lights 14, above a bumper 16 and above a license plate 18 and below the rear window view, for example. The exact place would depend on the vehicle.

The deployable hazard sign 12 has a light bar 20, for example, attached between and on two vertical mounting posts 22. These posts 22 may be made out of flat stock metal such as aluminum or plastic tubing. These mounting posts 22 should be able to withstand a force applied to the rear bumper 16 so as not to be damaged. A source of power 24 is further mounted on or near the sign 12. This source of power 24 may be a small 12 volt battery such as used on a motorcycle, A further feature of the sign 12 is an impact warning device 26 to be detailed below. An additional feature of the sign 12 is a means to raise the light bar 20 in height so that the light bar 20 is visible from a farther distance. This feature will be further detailed below also.

Figure 2:
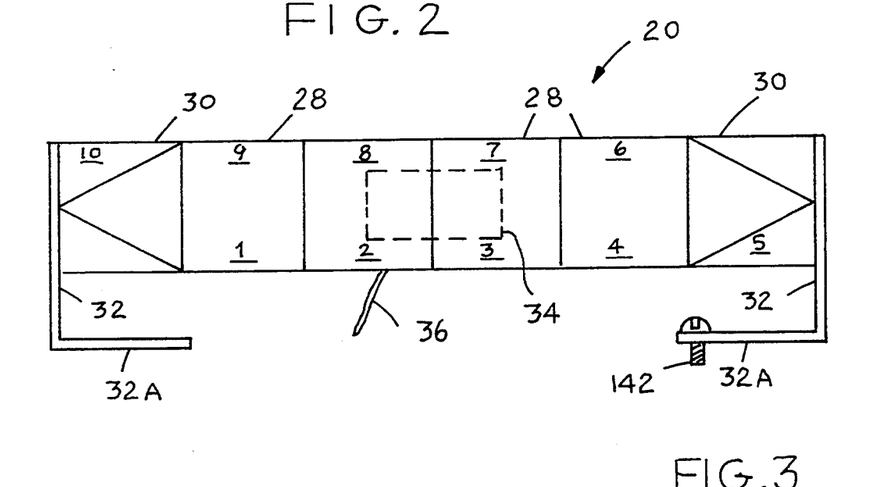
FIG. 2 illustrates by view a conventional light bar.

The light bar 20 may be of a conventional design, see FIG. 2, having a plurality of lighted segments 28 with directional lighted segments 30, being able to indicate left or right. An example of such a light bar is that made by Whelen Engineering Co., Chester, Conn., Model TA-836, called the Traffic Advisor, which mounts within the police car on the rear window deck and has a control box near the dash with appropriate electronics therein to control the mode of lighting.

In the present invention, a control module 34 is mounted either in or near the light bar 20 since this must retain the directions, all flashing, flashing to left, or flashing to right, for example, if such a style of light bar is used. A cable 36 connects to the appropriate controls and power to be detailed below. Although the present embodiment illustrates communicating to the sign 12 only before release, it is clearly possible to communicate to the sign 12 after release by means of an infrared transmitter which would direct the operations of the sign 12 from a distance such as a VCR controller directs a VCR.

As seen in FIG. 2, the light bar 20 has mounting backets 32 of ell shaped design. The posts 22 with a top 22A and a bottom 22B, shown in FIG. 3, may be attached to the brackets 32 at the foot 32A. The bottom foot 22B connects to a slide rail 38, FIG. 4. The combination of the slide rails 38, posts 22, cross brace and brackets are noted as a frame 54, FIG. 7.

The slide rail 38 has a notch 40 therein. The slide rail 38 is inserted into a mounting tube 42, FIG. 5, that is attached to the bottom of the vehicle 10 by bolts and straps, for example. Inside the tube 42 is a large spring 44, normally expanded, and attached at end 46 to the tube 42. Attached about the slide rail 38 is a spring cap 43. Inside the mounting tube 42 is a stop 45. The right end of the slide rail 38 goes through the hole in the stop 45 and the spring cap pushes the spring into compression. Also inside the tube 42 is a latching device 48 further detailed in FIG. 6. The latching device 48 has a latch 50 spring biased open and is closed by a cable 52 which can be controlled from inside vehicle 10 by the cable 52. The slide rail 38 is inserted into the mounting tube 42 until the notch 40 catches on the latch 50 holding the spring 44 in a highly compressed state. When the cable 52 is pulled, the latch 50 releases the slide rail 38 which is then ejected from the tube 42 with sufficient force. Each tube 42 has a latch device 48. Rather than being ejected, the sign 12 may be dropped from the car. Reattachment in this situation may be more difficult as will be seen below. The combination of the slide rails 38, posts 22 and cross brackets 55 are noted as a frame 54, FIG. 7.

Figure 5:
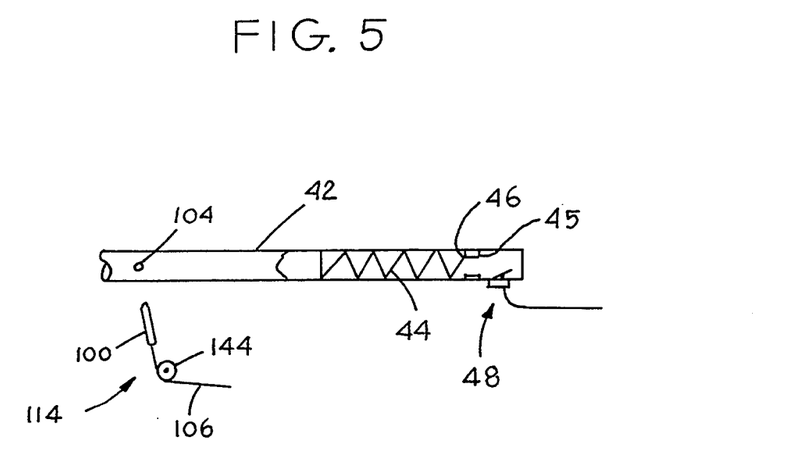
FIG. 5 illustrates by side view a mounting tube attached to a vehicle for holding the slide rail of FIG. 4.
Figure 6:
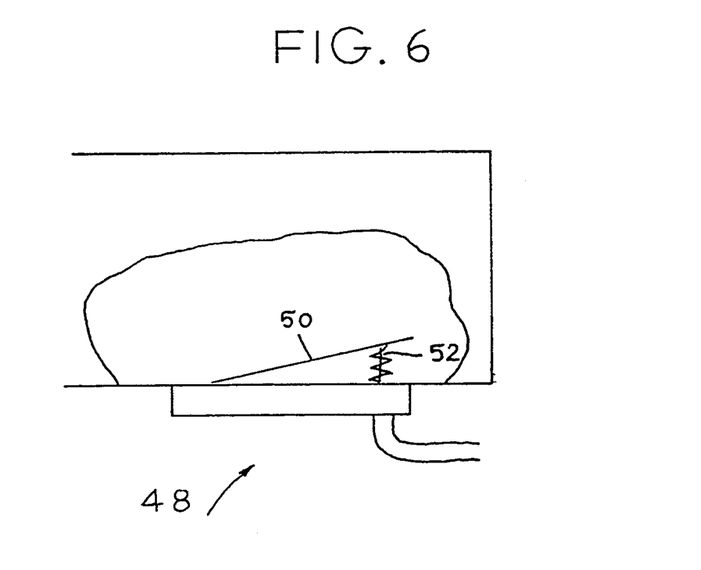
FIG. 6 illustrates a means for locking the slide rail of FIG. 4 inside the mounting tube of FIG. 5.
Figure 10A:
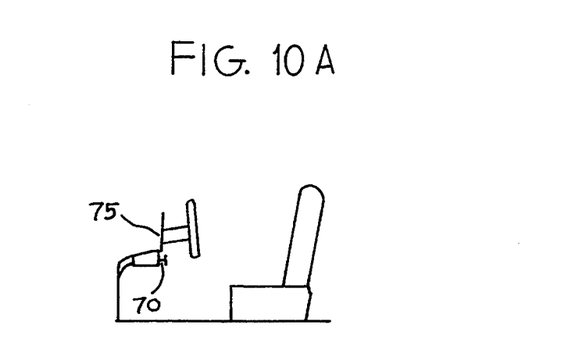
FIGS. 10A, 10B and 10C illustrate control means mounted within the vehicle.
Figure 10B:
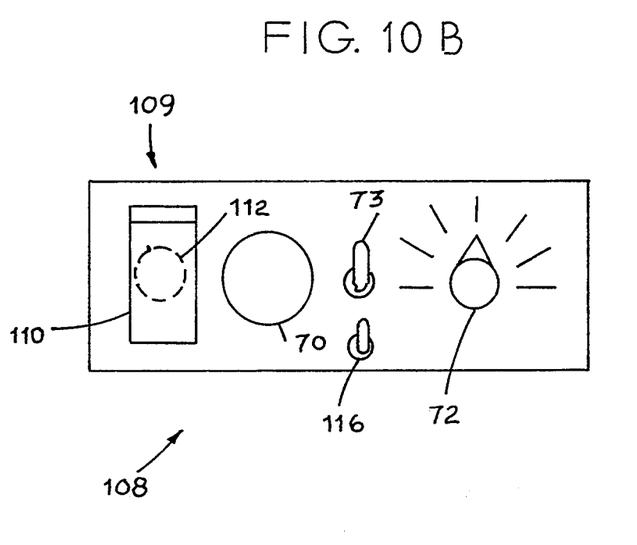

In order to prevent the accidental release of the sign 12, a fail-safe lock 114 is shown in FIG. 5. As seen therein, a pin 100 would be inserted through holes 104 and 102 after the slide rail 38 is inserted into the tube 42. A cable 106 connected to the pin 100 would run assisted by a cable guide 144 to a control device 108, FIG. 10B, where a fail-safe release 109 would be mounted. A cover 110 is positioned over the release knob 112 as seen in outline.

Figure 7:
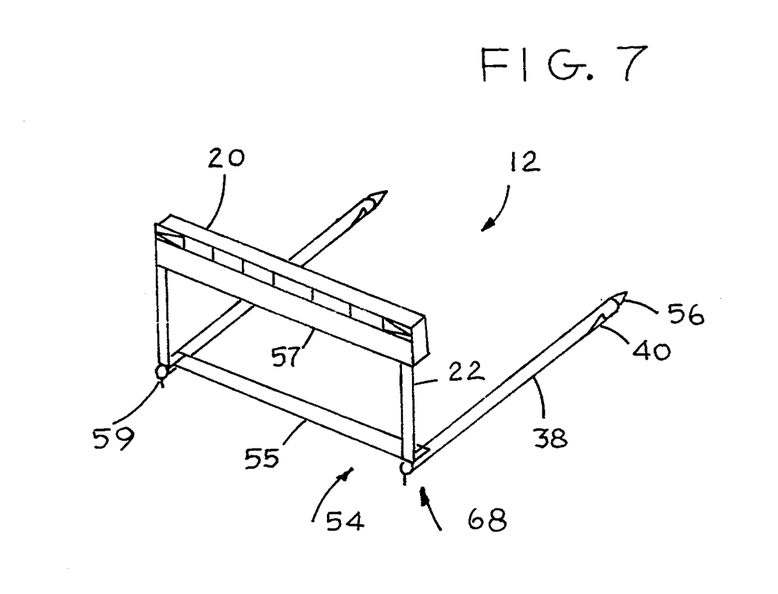
FIG. 7 illustrates by perspective view the present invention as placed upon a highway.

FIG. 7 shows the sign 12 deployed. As further seen thereon the cross bracket 55 provides additional structural rigidity. An additional bracket 57 is used for rigidity and for mounting such items as a battery, etc. If the light bar 20 side of the sign 12 is top heavy causing the sign 12 to tip over in wind, etc., weights 56 such as lead can be added to the slide rail 38 near the notch 40. In order to prevent the sign 12 from turning after release, the bottoms of the slide rails 38 may be made rough and/or sharp points 59 placed on the front of the slide rails 38 to dig into the pavement.

Figure 8A:
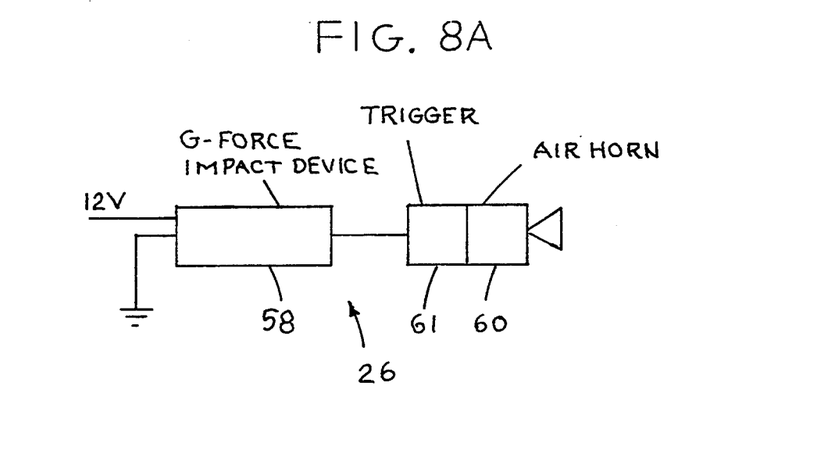
FIG. 8A illustrates a means for warning for attachment to the present invention for warning persons of an impact with the hazard sign of the present invention.
Figure 8B:
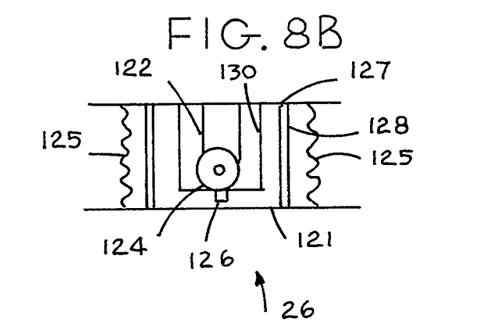
FIG. 8B illustrates a mechanical means to activate the air horn.

In order to warn emergency personnel down the road of an approaching danger such as a vehicle traveling in the breakdown lane or in the lane of the accident, for example, the sign 12 would have mounted thereon the impact warning device 26 which would have therein a g-force impact device 58, FIG. 8A, which would cause a trigger 61 to activate an air horn 60, for example. The g-force impact device 58 could have therein a spring biased weight which would only be moved to a stop if hit with a certain level of g-force as is easily predetermined. At the stop, an electrical signal would activate the trigger 61 thus activating the air horn 60 which can be heard 100s of feet away even in heavy traffic. The air horn 60 would be mounted within a box of sufficient strength to withstand the sign 12 being smashed and would remain running in such an event. Mounting of the impact device 58, etc. on a lower portion of the frame would prevent possible damage. A purely mechanical impact warning device 26 would thus be preferred as shown in FIG. 8B. As seen therein, an air horn 122 is placed within a crush-proof box 130. The air horn activator 126 is placed beyond the box 130. The box 130 is mounted between two plates 127 and 121 which are spring biased together by springs 125 but held apart by breakable supports 128. Upon a sufficient impact, the supports 128 break and the springs 125 pull the plates together and onto the activator 126.

Figure 9A:
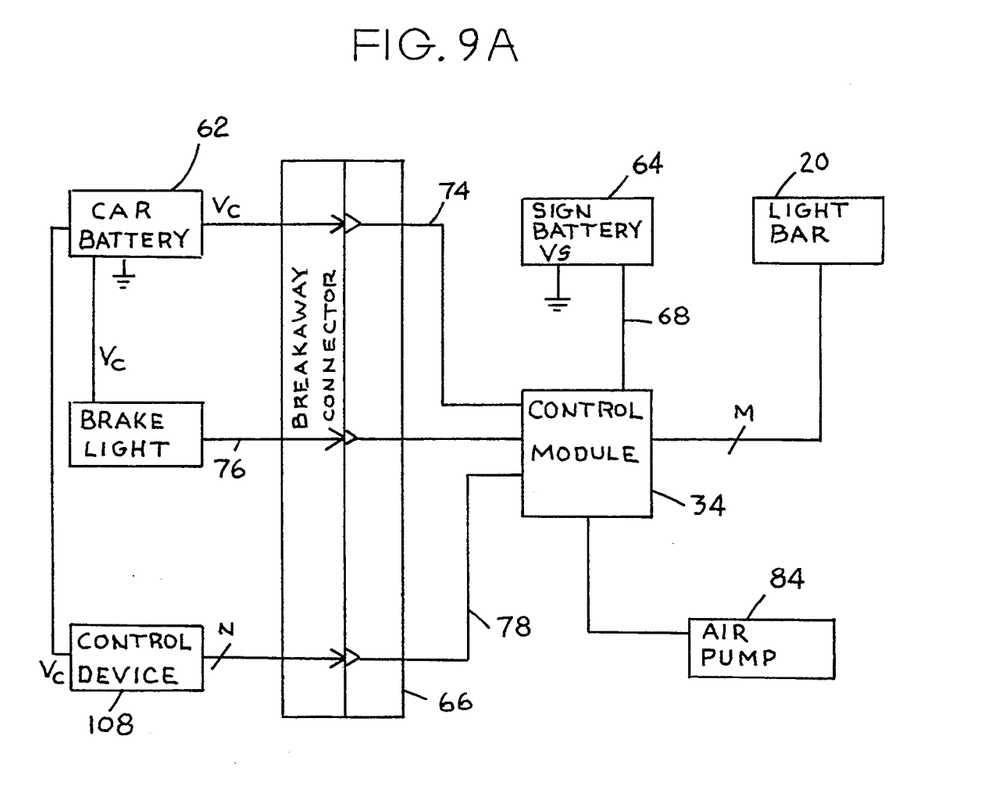
FIG. 9A illustrates an electrical block diagram of the present invention.
Figure 9B:
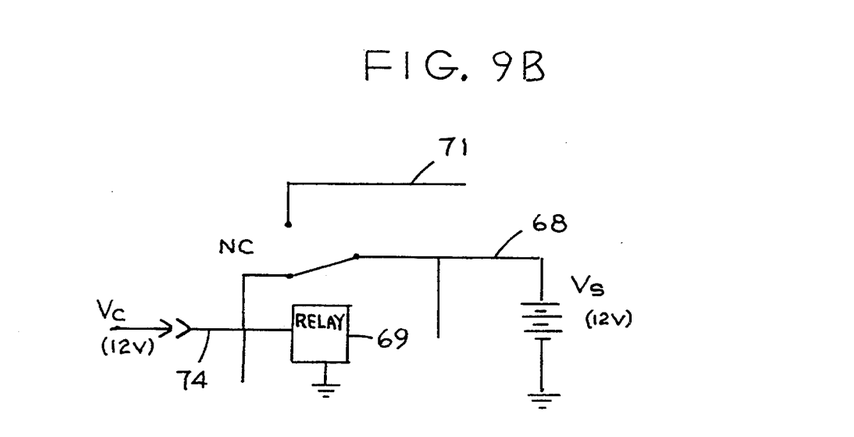
FIG. 9B illustrates a means for indicating release of the present invention.
Figure 9C:
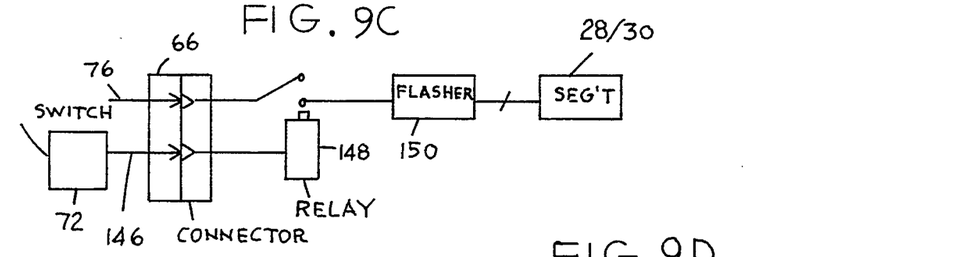
FIGS. 9C to 9F illustrate electrical circuits for operating a control device in cooperation with a control module of the present invention.
Figure 9D:
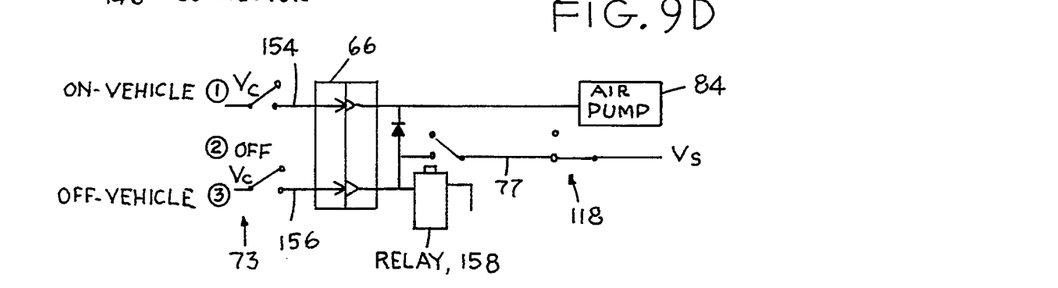
Figure 9E:
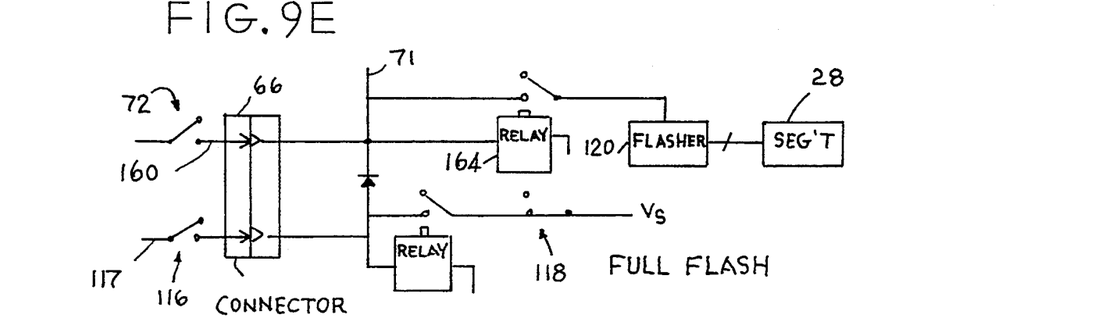
Figure 9F:
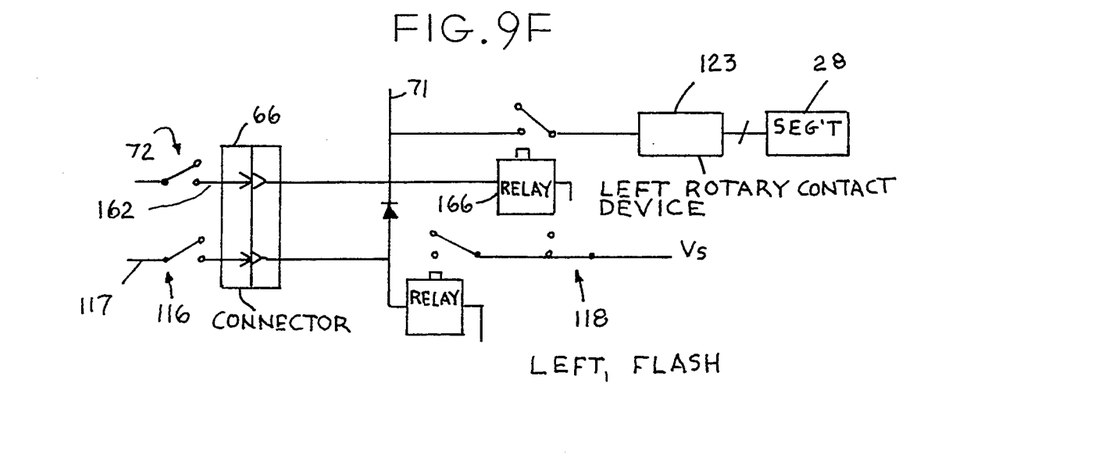
Figure 10C:
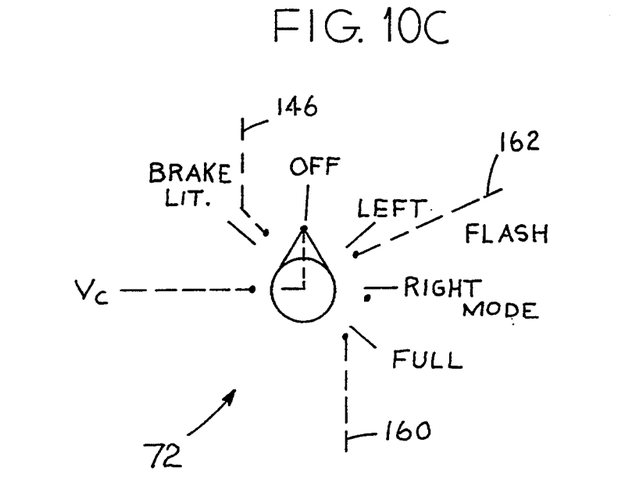

As further seen in FIG. 1, a power source 24 such as a sign battery 64 would be mounted on the bracket 57 of the sign 12. As seen in FIG. 9A, a car battery 62 is connected to the sign 12 battery 64 via a breakaway connector 66 indicated by a box. The breakaway connector 66 would be similar to electrical connectors used in automobiles except there would be no locking tabs. Once the sign 12 is deployed, and the breakaway connector 66 is separated, a lack of a battery voltage, Vc, on line 74 will cause the sign battery voltage, Vs, to be applied to the light bar 20 via a relay 69, FIG. 9B, in the control module 34. As also seen in FIG. 9A, the vehicle brake light on line 76 can also be used to activate the sign 12 through the connector 66 and the control module 34 while still attached to the vehicle 10. FIG. 9A shows a block labeled "Brake Light" with a line 76. When the foot actuates the brake, the brake light is "on" and a voltage is put on line 76. In FIG. 9C, if one selects the "Brake Lit" position on switch 72 of the control device 108, FIGS. 10B and C, a battery voltage Vc is applied by a line 146 through the connector 66 to cause a relay 148 to close and since a voltage is one line 76 when the brake is applied, the flasher 150 would cause the segments 28/30 to all flash in the sign 12 as long as the brake is applied. See also FIG. 9C. An air pump 84 is connected to the control module 34 and is controlled by the control device 108 through the connector 66. As seen in FIG. 10C, the switch 72 controls the manner of segment flashing also through the control module 34. Thus when the sign 12 is deployed and the connector 66 separated, the control module 34 would retain the last switch 72 setting and apply the battery voltage Vs to the light bar 20 in the proper manner. See FIGS. 9E and 9F where the switch 72 setting is held after release when a drop switch 116 is activated on the control device 108 on a line 117 to activate the appropriate relays for holding the switch 72 setting.

In order to reconnect the sign 12, a reconnect switch 118 located on the sign 12 is opened so that the relays release the switch 72 setting. Once the sign 12 is reconnected via the breakaway connector 66, the reconnect switch 118 can be closed. The drop switch 116 is not activated if the sign 12 is operated while attached to the vehicle 10. In FIG. 9E, the Vs voltage is applied to a flasher 120 being conventional to all of the segmented lights 28. If one desires full flash on the sign 12 while on the vehicle or off, the "Full" position of switch 72 is selected, FIG. 10C. This puts Vc on line 160 which causes relay 164 to close and puts voltage onto the flasher 120 which causes all segments 28 to flash. This operates similar to circuit in FIG. 9C in the Brake mode. In FIG. 9F, the Vs voltage is applied to a left rotary contact device 123 which would operate the segments in a left flashing manner. The right flashing mode would operate in the same manner.

Although the electronics within the control module 34 are not completely disclosed in detail such is considered to be conventional. For example, relays are clearly able to provide the necessary transfer of voltages. Solid state electronic devices would reduce the size of the control module 34. FIG. 9B illustrates that when Vc is applied to relay 69, Vs is being charged. If Vc is equal to zero then Vs is applied to line 71 until Vc is applied. Line 71 applies Vs voltage to other devices when the sign 12 is separated from the vehicle. As long as Vc is present, every change of the switch 72, FIG. 10C, is entered into the control module 34. As seen in FIG. 2, the segments 28 and 30 are numbered 1 to 5, for example. If a motor driven rotary contact device 123 touches lines to segments 1 to 5, in that order, the segments light to the right. If the rotary contact device 122 touches lines to segments 6 to 10, it flashes to the left.

In operation, the deployable sign 12 is attached to the vehicle 10 by sliding the slide rails 38 into the mounting tubes 42 that are attached below the rear of the vehicle 10. The sign 12 is designed such that to accomplish this, it is rocked back at the right angle end 68, FIG. 7, until the rails 38 can easily enter the tubes 42. This frame 54 is pushed in until both latch devices 48 lock and the fail-safe lock 114 is reconnected. The reconnect switch 118 is opened then closed and then the electrical connector 66 is connected. This simple procedure places the sign 12 in operation. Before the release of the sign 12, the switch 72 setting is selected as well as the drop switch 116 is activated. In order to release the sign 12, a handle 70, is pulled, for example, under the dash 75, FIG. 10A, causing the sign 12 to be pushed out of the tubes 42 and as this occurs the connector 66 separates then the vehicle 10 can proceed to the point of the accident, etc., down the road leaving the hazard warning sign 12 operating by itself. The sign 12 would operate by itself for several hours on the battery. The sign 12 would be retrieved by another vehicle 10 without the sign 12 attached but having the tubes 42 thereon or the deploying vehicle 10 could backup to the sign 12.

Figure 11A:
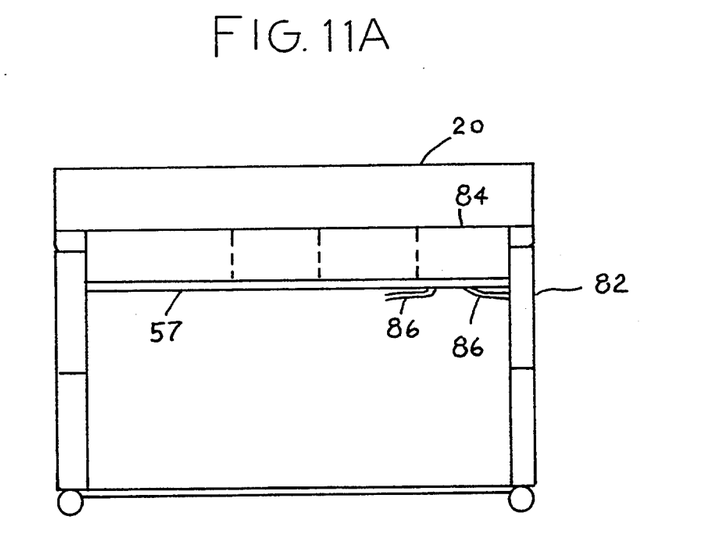
FIGS. 11A and 11B illustrate a means for elevating the light bar of the present invention.
Figure 11B:
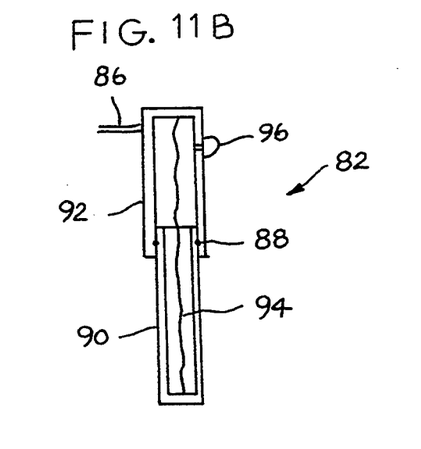

A further feature of the present invention is the ability to elevate the light bar 20 as taught in FIGS. 11A and 11B. As seen in FIG. 11A, light bar 20 is mounted atop telescoping posts 82 which are driven by an air pump 84 through lines 86. In FIG. 11B, a telescoping post 82 is shown as concentric tubes 90 and 92 with an 0-ring 88 therebetween for an air seal. To prevent over extension, a tie 94 having a predetermined length is connected between the top of tube 92 and the bottom of tube 90. A pressure relief valve 96 further allows a uniform pressure within the posts 82 and for deflation on reconnect. The air pump 84 would be activated upon the deployment of the sign 12 by a three position switch 73 on the control device 108 of FIG. 10B. One position "1" would operated the pump while on the vehicle 10, another position "2" would be off and the other position "3" would operated the pump after release via line 156 activating a relay 158 to apply voltage Vs to pump 84. Voltage Vs holds the relay 158 closed until disconnect switch 118 is opened. If not deployed, the air pump would raise the light bar 20 while attached to the vehicle 10.

Figure 3:
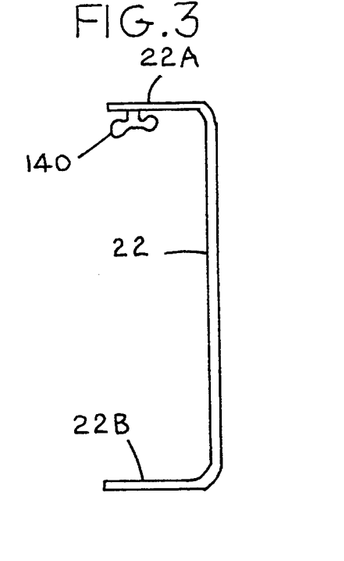
FIG. 3 illustrates by side view a support post for the light bar of FIG. 2.
Figure 4:
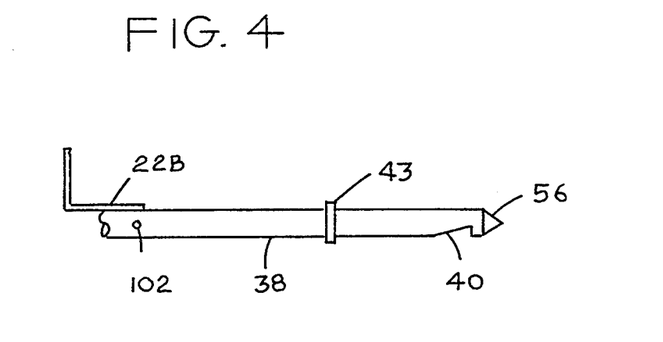
FIG. 4 illustrates by side view a slide rail for use in attaching the invention to a vehicle.
Figure 12:
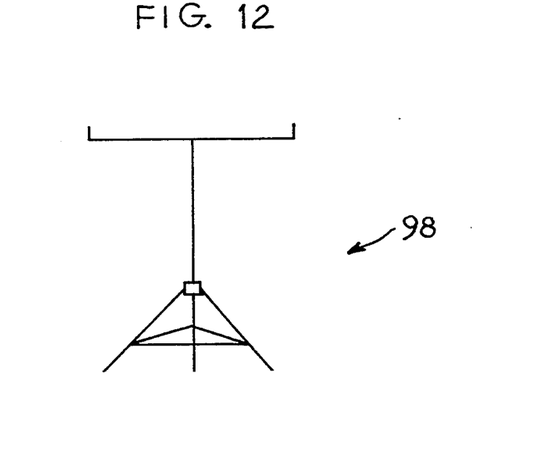
FIG. 12 illustrates an optional deployable stand for use with the invention.

Because bar 20 is light in weight, alternatively, bar 20 could be separable by hand action by using wing nuts, for example, a wing nut 140 and bolt 142, FIGS. 2 and 3, between the posts 22 and brackets 32 for mounting at a higher elevation. This would require conventional supports such as a folding tripod 98 as seen in FIG. 12. A person would have to return to the place the sign 12 has been dropped to raise the bar 20. The tripod 98 would be stored in the trunk.

The purpose of the sign 12 is to provide adequate warning to approaching traffic and to provide a warning to rescue personnel or police personnel or victims about an approaching vehicle that has hit the sign 12; this, in particular, would happen if the driver of the approaching vehicle is drunk or otherwise incapacitated. The benefits of being able to deploy the deployable hazard sign from a moving vehicle are clear and obvious and not provided by other conventional warning signs where the operator would have to stop, remove the sign from the vehicle, and position it while the approaching traffic is deciding where to go.

It is further within the scope of the present invention of stopping or almost stopping the vehicle before deployment, releasing the sign 12 and driving on to the scene of the incident without outside personal intervention as to the deployment of the sign 12.

Clearly, many modifications and variations of the present invention are possible in light of the abvoe teachings and it is therefore understood, that within the inventive scope of the inventive concept, the invention may be practiced other than specifically claimed below.

What is claimed is:

1. A system for deploying a hazard sign from a vehicle for warning approaching vehicles of a road hazard, said system comprising:

a means for warning said approaching vehicles of said road hazard, said warning means projecting warning signals by means of at least one predetermined flashing light segment having visual information therein as to the warning signal;

a frame, said frame being detachably connected to a rear area of said vehicle and having said warning means attached thereon;

a means for releasing said frame from said vehicle, said releasing means having a release handle device within said vehicle for communicating to a frame release device attached to said rear area of said vehicle, said frame being reconnectable to said frame release device;

a means for powering said warning means upon release of said frame from said vehicle, said powering attached to said frame; and a means for controlling said warning means, said warning means having a control device within said vehicle and a control module mounted on said frame, said control device having selectable settings for operating said warning means either before or after said release of said frame from said vehicle, said control device communicating said settings to said control module, said control module retaining said settings after the release until being reset;

whereby upon approaching said road hazard, a person in said vehicle is able to select a mode of operating said warning means and said releasing means without personal intervention, said frame falling to a road surface, said warning means operating to alert said approaching vehicles to said road hazard, said vehicle being able to reacquire said frame for future emergencies.

2. A system as defined in claim 1 further including an audible warning means attached to said frame, said audible warning means being activated by an impact to provide a warning to persons located a distance from a deployed frame.

3. A system as defined in claim 2 wherein said audible warning means includes an activation means and an air horn to be activated upon said impact thereon.

4. A system as defined in claim 1 further including means for elevating said warning means to a predetermined height to be seen by said approaching vehicles in heavy traffic.

5. A system as defined in claim 4 wherein said means for elevating comprises:
   an air pump, said air pump being activated by said person in said vehicle upon command by said person in said vehicle or upon said release;
   a pair of telescoping posts, said air pump connected to said posts whereupon pressurized air causes said posts to be extended to said predetermined height, said posts mounted between said warning means and slide rails;
   a means for preventing over extension of said posts; and
   a means to control pressure within said posts.

6. A system as defined in claim 4 wherein said elevating means is a portable stand, said warning means being separable from said frame and mountable to said stand, said warning means communicating by a cable to said control module.

7. A system as defined in claim 1 wherein said warning means are lighted segments, said segments being able to operate in a left and right flashing mode, a left flashing mode and a right flashing mode.

8. A system as defined in claim 1 wherein said vehicle has mounted thereon a pair of mounting tube, said mounting tubes having therein a biasing means for ejecting said frame therefrom upon command by said person in said vehicle and a latching means for holding said frame therein.

9. A system as defined in claim 8 wherein said frame has thereon a pair of slide rails, said slide rails being insertable into said mounting tubes against said biasing means therein and attached to said vehicle, said slide rails selectively engaging said latching means.

10. A system as defined in claim 8 wherein said control device includes means comprising:
    a selector switch, said switch indicating an operating mode of said warning means before or after said release;
    a drop switch, said drop switch indicating that said frame is to be released;
    said release handle device, said release handle device activating said latching device in said mounting tubes; and
    a fail-safe release, said fail-safe release requiring activating before said release handle is activated.

11. A system as defined in claim 1 further including a fail-safe locking device to prevent accidental release of said frame.

12. A system as defined in claim 1 wherein said control device communicates to said control module through a breakaway connector.

13. A system for deploying a hazard sign from a vehicle for warning approaching vehicles of a road hazard, said system comprising:
    a means for warning said approaching vehicles of said road hazard, said warning means projecting warning signals by means of at least one predetermined flashing light segment having visual information therein as to the warning signal;
    a frame, said frame being detachably connected to a rear area of said vehicle and having said warning means attached thereon;
    a means for releasing said frame from said vehicle, said releasing means having a release handle device within said vehicle for communicating to a frame release device attached to said rear area of said vehicle, said frame being reconnectable to said frame release device;
    a means for powering said warning means upon release of said frame from said vehicle, said powering means attached to said frame; and
    a means for controlling said warning means, said warning means having a control device within said vehicle and a control module mounted on said frame, said control device having selectable settings for operating said warning means either before or after said release of said frame from said vehicle, said control device communicating said settings to said control module, said control module retaining said settings after the release until reset; and
    a means for audible warning attached to said frame, said warning means being activated by an impact to provide a warning to persons located a distance from a deployed frame;
    whereby upon approaching said road hazard, a person in said vehicle is able to select a mode of operating said warning means and said releasing means without personal intervention, said frame falling to a road surface, said warning means operating to alert said approaching vehicles to said road hazard, said vehicle being able to reacquire said frame for future emergencies.

14. A method of providing a hazard warning to approaching traffic, said method comprising the steps of:

providing a vehicle with a deployable hazard sign, said deployable hazard sign being deployable from said vehicle without a requirement of personal intervention outside of said vehicle during deployment;

selecting an operating mode of said hazard sign having thereon means for warning;

releasing said hazard sign from said vehicle, said releasing occurring before a road harzard, upon said releasing, said hazard sign falls from said vehicle onto said road without said personal intervention; and recovering said hazard sign after said road hazard is cleared, said hazard sign being reattached to said vehicle, upon reattachment, said hazard sign is then deployable.

15. A method as defined in claim 14 further including warning persons of an impact with said hazard sign, said warning being of an audible nature coming from said sign.

16. A method as defined in claim 14 further including automatically elevating said hazard sign to a preset height to be seen by said approaching traffic.

17. A method as defined in claim 16 wherein said elevating step comprises a deployable stand, further including attaching said hazard sign to said deployable stand, said attaching step requiring personal intervention after deployment of said sign.

18. A method as defined in claim 14 wherein said selecting step comprises a breakaway connector for providing a car battery power and operating mode signal, said breakaway connector is provided between said vehicle and said hazard sign.

19. A method as defined in claim 18 wherein said hazard sign has a frame which is ejected from said vehicle by a spring action.

* * * * *